US010879682B2

United States Patent
Kawada et al.

(10) Patent No.: US 10,879,682 B2
(45) Date of Patent: Dec. 29, 2020

(54) ELECTRICAL CONNECTION BOX AND WIRE HARNESS

(71) Applicant: Yazaki Corporation, Tokyo (JP)

(72) Inventors: Daisuke Kawada, Shizuoka (JP); Yuki Komiya, Shizuoka (JP); Hirotaka Kiyota, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/246,195

(22) Filed: Aug. 24, 2016

(65) Prior Publication Data

US 2017/0063069 A1 Mar. 2, 2017

(30) Foreign Application Priority Data

Aug. 31, 2015 (JP) .................. 2015-171084

(51) Int. Cl.
*H02G 15/117* (2006.01)
*H02G 3/08* (2006.01)
(Continued)

(52) U.S. Cl.
CPC ......... *H02G 3/081* (2013.01); *B60R 16/0238* (2013.01); *H01B 7/0045* (2013.01); *H02G 15/117* (2013.01)

(58) Field of Classification Search
CPC ................ H01R 13/447; H01R 13/502; B60R 16/0238; H02G 15/117; H02G 3/086; H02G 3/081; H01B 7/0045
See application file for complete search history.

(56) References Cited

U.S. PATENT DOCUMENTS 4,226,493 A * 10/1980 Cairns ................... H01H 85/20
                                                                    439/357
4,887,978 A * 12/1989 Murakami ........... H01R 13/506
                                                                    439/553
(Continued)

FOREIGN PATENT DOCUMENTS

CN       200973004 Y       11/2007
CN       201048260 Y        4/2008
(Continued)

OTHER PUBLICATIONS

Chinese Office Action for the related Chinese Patent Application No. 201610768034.4 dated Oct. 31, 2017.
(Continued)

*Primary Examiner* — Steven T Sawyer
*Assistant Examiner* — Paresh H Paghadal
(74) *Attorney, Agent, or Firm* — Kenealy Vaidya LLP

(57) ABSTRACT

An electrical connection box includes a case including a frame that holds electronic components and a cover that blocks an opening portion of the frame, a power supply connection portion provided inside the case, an external power supply being connected to the power supply connection portion, and a cover portion that covers the power supply connection portion from above, in which the cover portion has a hole portion that communicates a space portion on a side of the power supply connection portion with respect to the cover portion with a space portion above the cover portion inside the case, and is configured to detachably hold a component.

9 Claims, 11 Drawing Sheets

(51) Int. Cl.
*B60R 16/023* (2006.01)
*H01B 7/00* (2006.01)

(56) References Cited

U.S. PATENT DOCUMENTS

| | | | | |
|---|---|---|---|---|
| 5,277,676 A * | 1/1994 | Holland | ............... | A63B 1/00 482/38 |
| 5,314,354 A * | 5/1994 | Nomura | ............... | H01H 85/2045 439/620.27 |
| 5,345,211 A * | 9/1994 | Muramatsu | ............... | H01H 85/2035 337/186 |
| 5,403,193 A * | 4/1995 | Ito | ............... | H01R 9/245 439/34 |
| 5,438,310 A * | 8/1995 | Ikari | ............... | H01H 85/20 337/186 |
| 5,748,068 A * | 5/1998 | Kiyota | ............... | H01H 85/205 337/186 |
| 5,857,874 A * | 1/1999 | Takeuchi | ............... | H01H 9/10 439/620.26 |
| 5,967,819 A * | 10/1999 | Okada | ............... | H01R 9/245 439/212 |
| 6,004,159 A * | 12/1999 | Liang | ............... | H01R 11/22 439/620.27 |
| 6,178,106 B1 * | 1/2001 | Umemoto | ............... | H01R 11/12 363/146 |
| 6,224,426 B1 * | 5/2001 | Kaneko | ............... | H01H 85/2045 439/620.27 |
| 6,443,771 B2 * | 9/2002 | Kondo | ............... | H01H 85/24 439/620.27 |
| 6,824,430 B2 * | 11/2004 | Matsumura | ............... | H01H 85/044 439/620.29 |
| 6,848,946 B2 * | 2/2005 | Vicenza | ............... | B60R 16/0238 439/620.29 |
| 6,853,289 B2 * | 2/2005 | Scoggin | ............... | H01H 85/547 337/194 |
| 7,670,184 B2 * | 3/2010 | Akahori | ............... | H02G 3/086 439/620.27 |
| 8,835,760 B2 | 9/2014 | Saimoto et al. | | |
| 9,145,099 B2 | 9/2015 | Komiya et al. | | |
| 9,320,165 B2 * | 4/2016 | Gruber | ............... | H05K 5/0069 |
| 9,373,828 B2 * | 6/2016 | Kawatani | ............... | B62K 11/04 |
| 2002/0043876 A1 * | 4/2002 | Kawaguchi | ............... | B60R 16/0239 307/10.1 |
| 2005/0122694 A1 * | 6/2005 | Kane | ............... | H05K 5/0069 361/752 |
| 2005/0150674 A1 * | 7/2005 | Munoz | ............... | H01R 13/52 174/53 |
| 2009/0033453 A1 * | 2/2009 | Deno | ............... | H01H 85/2045 337/205 |
| 2010/0136836 A1 * | 6/2010 | Maebashi | ............... | H02G 3/08 439/620.27 |
| 2011/0306221 A1 * | 12/2011 | Kamo | ............... | H01R 13/696 439/76.2 |
| 2013/0034974 A1 * | 2/2013 | Akahori | ............... | H01R 9/2458 439/76.2 |
| 2013/0280952 A1 * | 10/2013 | Saimoto | ............... | H01R 13/42 439/527 |
| 2013/0307660 A1 * | 11/2013 | Ikeda | ............... | H01H 85/54 337/4 |
| 2014/0051270 A1 * | 2/2014 | Miyazaki | ............... | B60R 16/0238 439/76.2 |
| 2014/0170868 A1 | 6/2014 | Komiya et al. | | |
| 2015/0044903 A1 * | 2/2015 | Gruber | ............... | H01R 13/46 439/540.1 |
| 2016/0294075 A1 * | 10/2016 | Shiraki | ............... | H01R 13/642 |

FOREIGN PATENT DOCUMENTS

| | | |
|---|---|---|
| CN | 101783488 A | 7/2010 |
| CN | 102157824 A | 8/2011 |
| CN | 202282586 U | 6/2012 |
| CN | 103370836 A | 10/2013 |
| CN | 103378569 A | 10/2013 |
| CN | 103887746 A | 6/2014 |
| JP | 09-283004 A | 10/1997 |
| JP | 2009-189082 A | 8/2009 |
| JP | 2013-17295 A | 1/2013 |
| WO | WO-2012111299 A1 * | 8/2012 ......... B60R 16/0238 |

OTHER PUBLICATIONS

Chinese Office Action for the related Chinese Patent Application No. 201610768034.4 dated Nov. 19, 2018.
Chinese Office Action for the related Chinese Patent Application No. 201610768034.4 dated Jun. 12, 2018.
Chinese Office Action for the related Chinese Patent Application No. 201610768034.4 dated Mar. 26, 2019 (with machine translation).

* cited by examiner

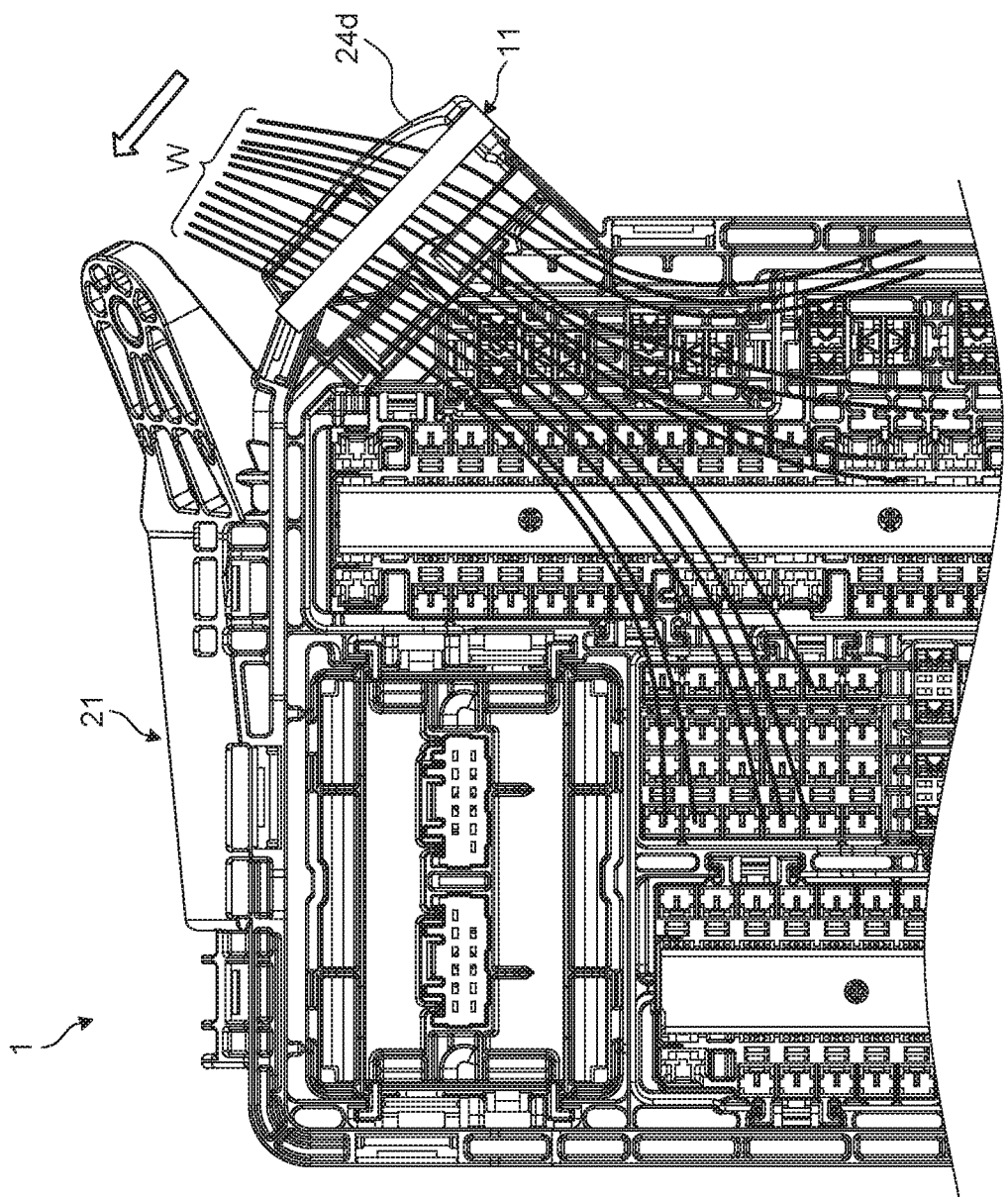

ELECTRICAL CONNECTION BOX AND WIRE HARNESS

CROSS-REFERENCE TO RELATED APPLICATION(S)

The present application claims priority to and incorporates by reference the entire contents of Japanese Patent Application No. 2015-171084 filed in Japan on Aug. 31, 2015.

BACKGROUND OF THE INVENTION

1. Field of the Invention

The present invention relates to an electrical connection box and a wire harness.

2. Description of the Related Art

There has been an electrical connection box having a power supply connection portion to which an external power supply is connected. For example, Japanese Patent Application Laid-open No. 2013-17295 discloses a technology of an electrical connection box having a fuse block provided with a power supply input terminal electrically connected to a power supply.

When a power supply connection portion is exposed inside an electrical connection box, there is a possibility that a finger or a tool will touch a metal portion. It is effective to cover the power supply connection portion to inhibit the power supply connection portion from being unintentionally touched. However, when the power supply connection portion is merely covered, heat generated in the power supply connection portion is accumulated, which causes a temperature rise of the power supply connection portion.

SUMMARY OF THE INVENTION

An object of the present invention is to provide an electrical connection box and a wire harness which allow compatibility between inhibiting the power supply connection portion from being unintentionally touched and suppressing a temperature rise of the power supply connection portion.

In order to achieve the above mentioned object, an electrical connection box according to one aspect of the present invention includes a case including a frame that holds an electronic component and a cover that blocks an opening portion of the frame; a power supply connection portion provided inside the case, an external power supply being connected to the power supply connection portion; and a cover portion that covers the power supply connection portion from above, wherein the cover portion has a hole portion that communicates a space portion on a side of the power supply connection portion with respect to the cover portion with a space portion above the cover portion inside the case, and is configured to detachably hold a component.

According to another aspect of the present invention, in the electrical connection box, it is preferable that the component detachably held by the hole portion is a fuse.

According to still another aspect of the present invention, in the electrical connection box, it is preferable that the cover portion includes a pair of wall portions extending in an up-down direction and facing each other with the power supply connection portion interposed therebetween, and covers the power supply connection portion from both sides by the pair of wall portions.

According to still another aspect of the present invention, a wire harness includes a case including a frame that holds an electronic component and a cover that blocks an opening portion of the frame; a power supply connection portion provided inside the case, an external power supply being connected to the power supply connection portion; a cover portion that covers the power supply connection portion from above; and an electric wire connected to the electronic component, wherein the cover portion has a hole portion that communicates a space portion on a side of the power supply connection portion with respect to the cover portion with a space portion above the cover portion inside the case, and is configured to detachably holds a component.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a diagram illustrating a fixed state of electric wires according to a comparative example.

DETAILED DESCRIPTION OF THE PREFERRED EMBODIMENTS

Hereinafter, a detailed description will be given of an electrical connection box and a wire harness according to an embodiment of the present invention with reference to drawings. It should be noted that the invention is not restricted by the embodiment. In addition, a component in the embodiment below includes a component that can be easily assumed by those skilled in the art or substantially the same component.

Embodiment

Figure 1:
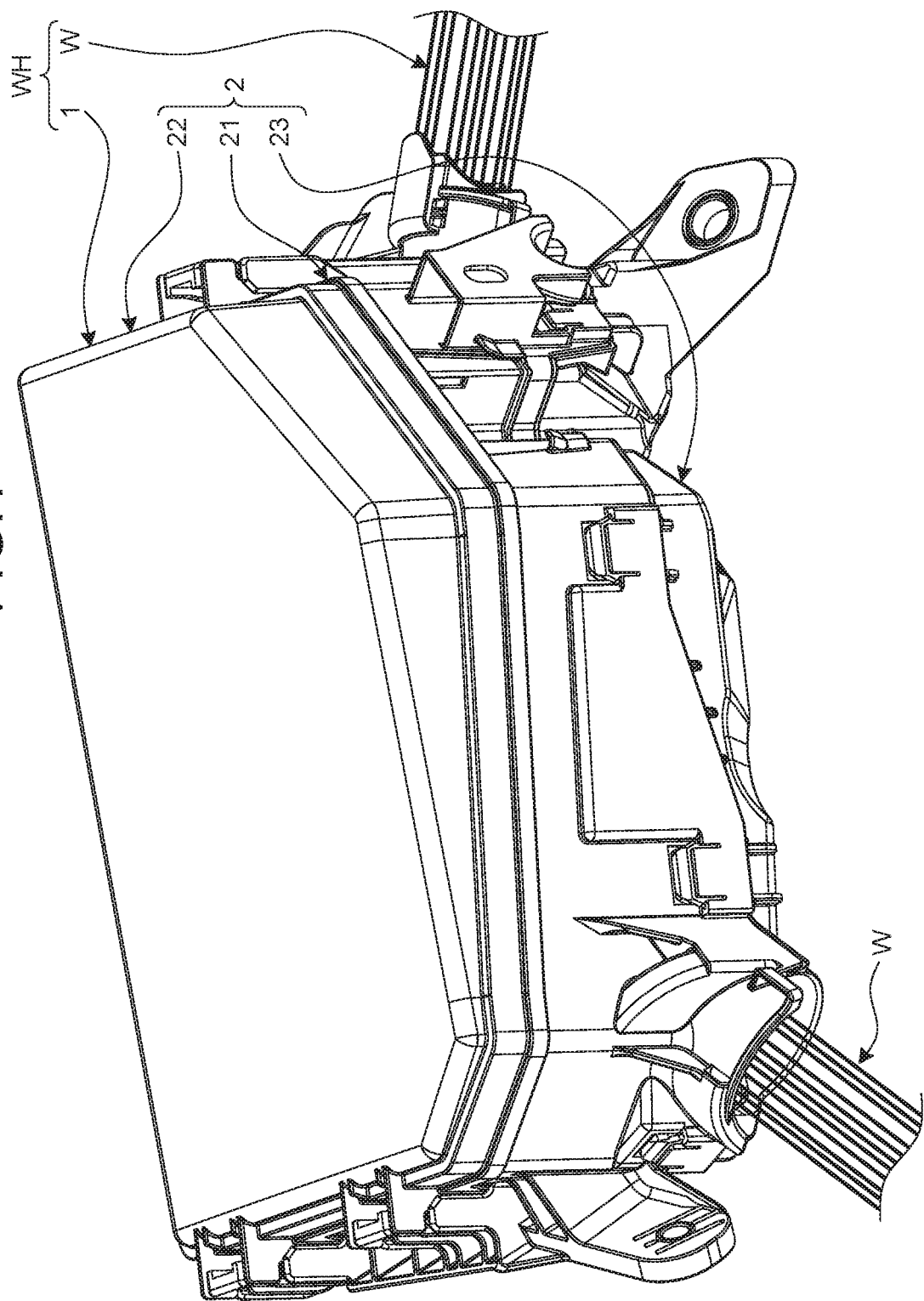
FIG. 1 is a perspective view of an electrical connection box and a wire harness according to an embodiment.

An embodiment will be described with reference to FIG. 1 to FIG. 11. The present embodiment relates to an electrical connection box and a wire harness. FIG. 1 is a perspective view of the electrical connection box and the wire harness according to the embodiment of the present invention, FIG.

Figure 3:
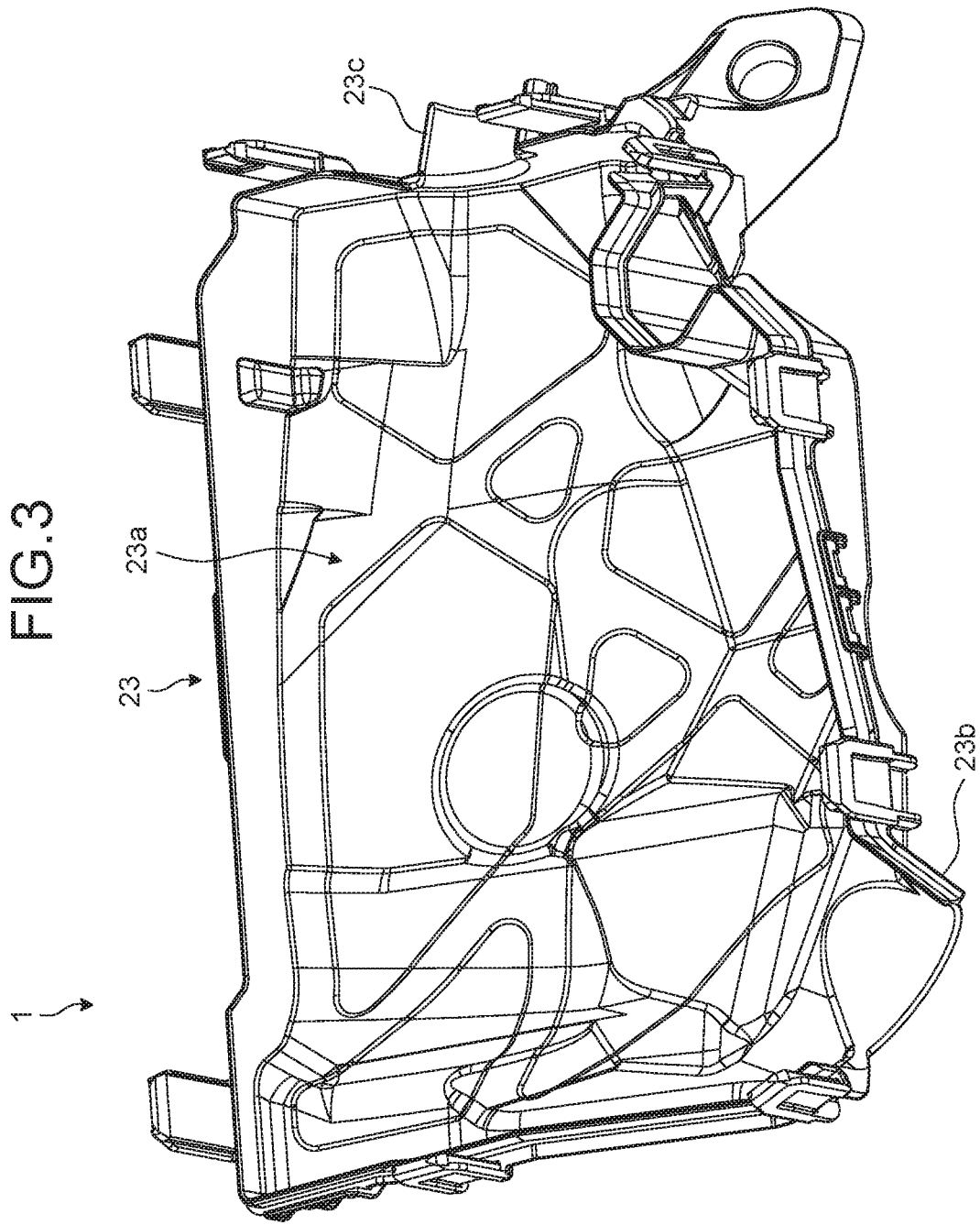
FIG. 3 is a perspective view of a lower cover according to the embodiment.
Figure 4:
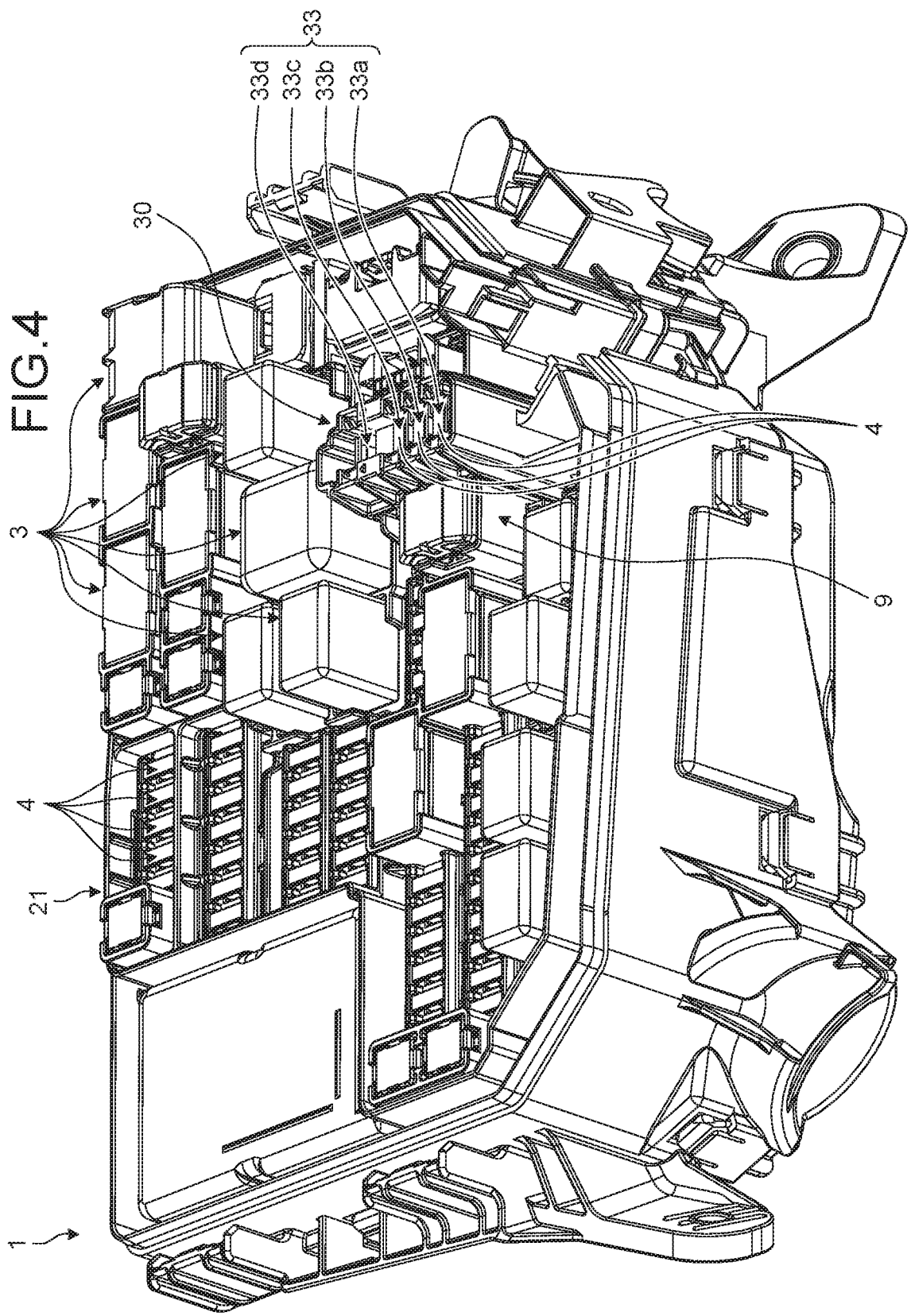
FIG. 4 is a perspective view illustrating an inside of the electrical connection box according to the embodiment.
Figure 5:
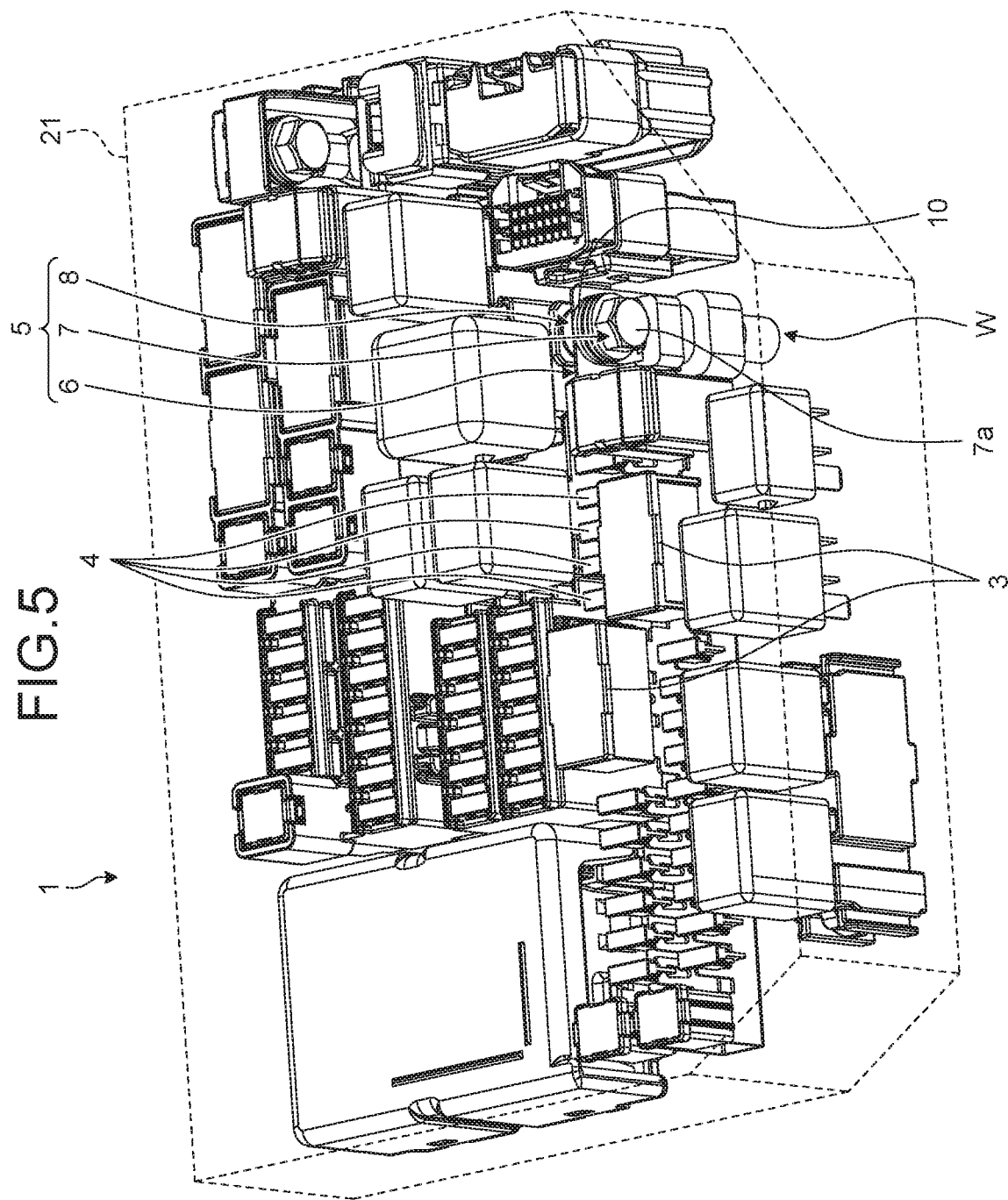
FIG. 5 is a perspective view illustrating a power supply connection portion according to the embodiment.
Figure 6:
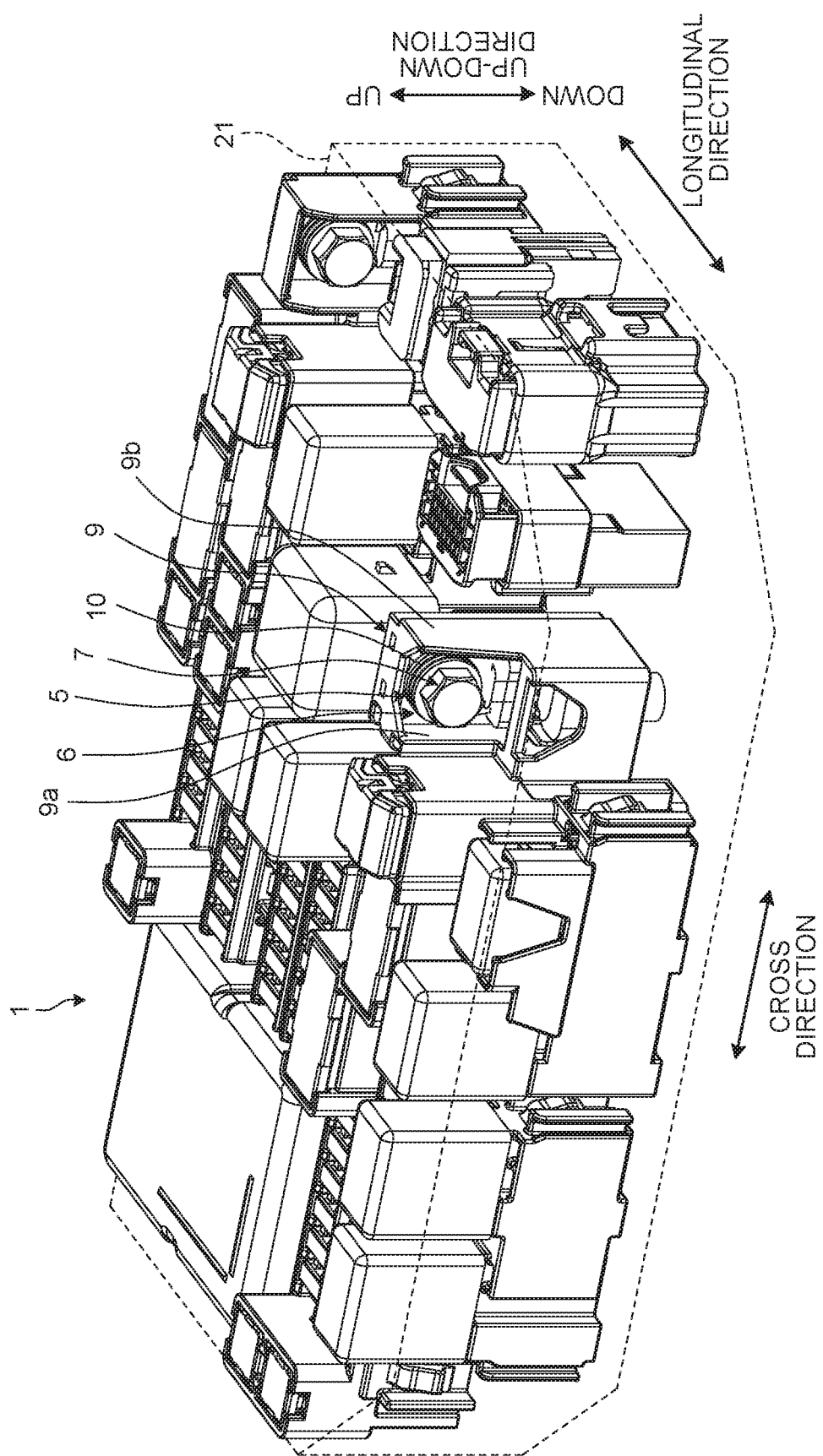
FIG. 6 is a perspective view illustrating the power supply connection portion and a holding member according to the embodiment.
Figure 7:
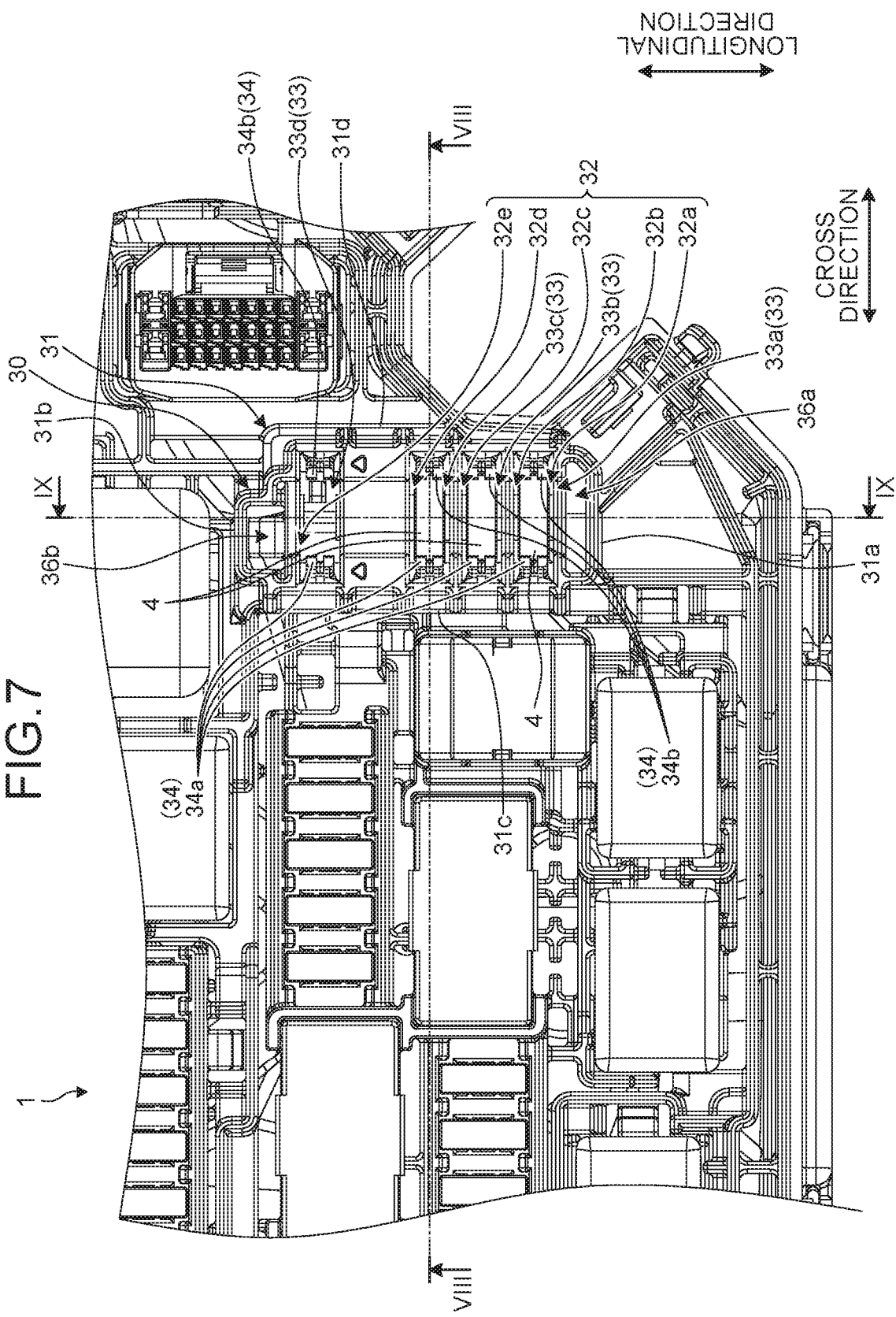
FIG. 7 is a plan view illustrating the inside of the electrical connection box according to the embodiment.
Figure 8:
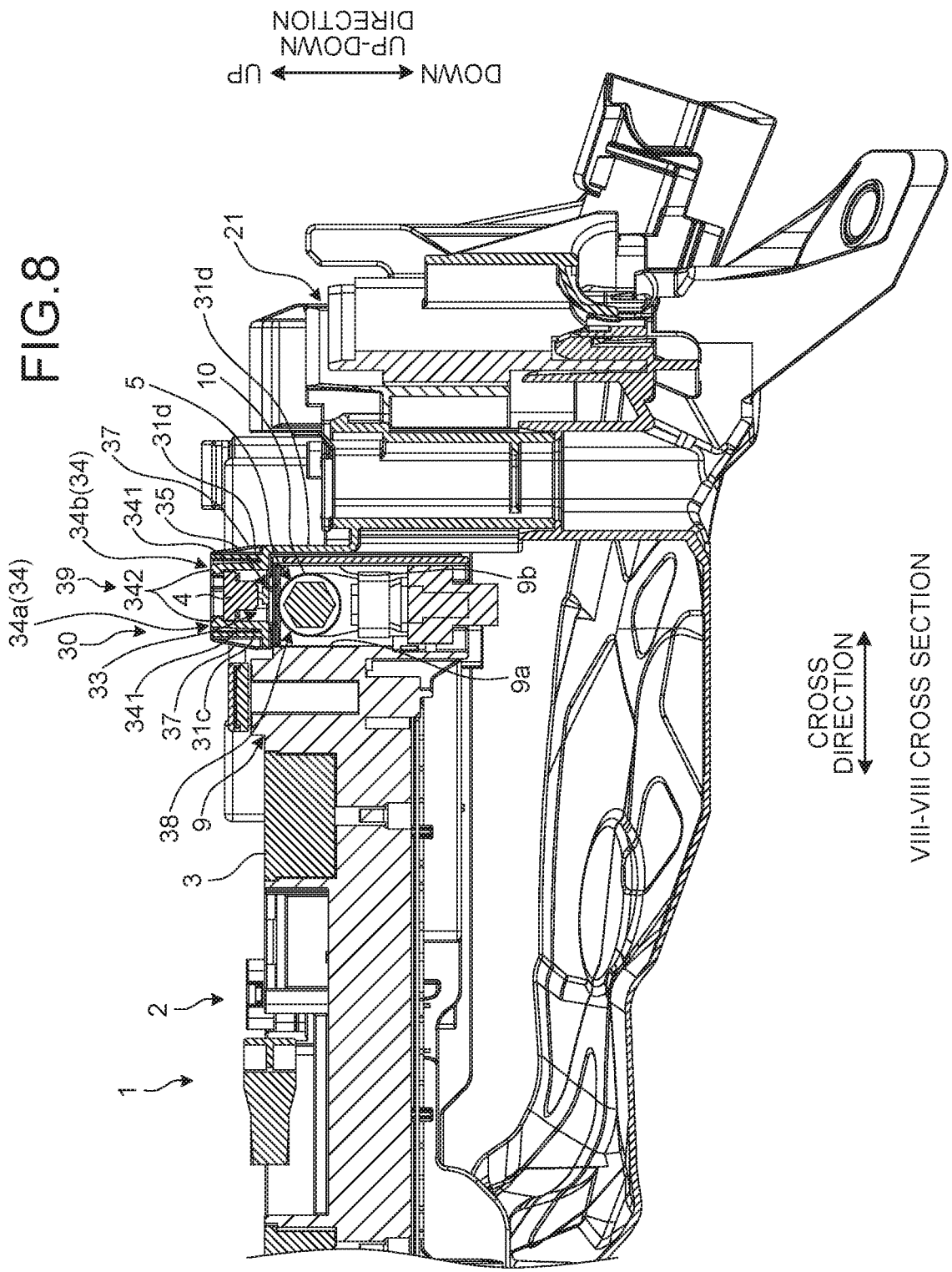
FIG. 8 is a cross-sectional view related to the power supply connection portion and a cover portion according to the embodiment.
Figure 9:
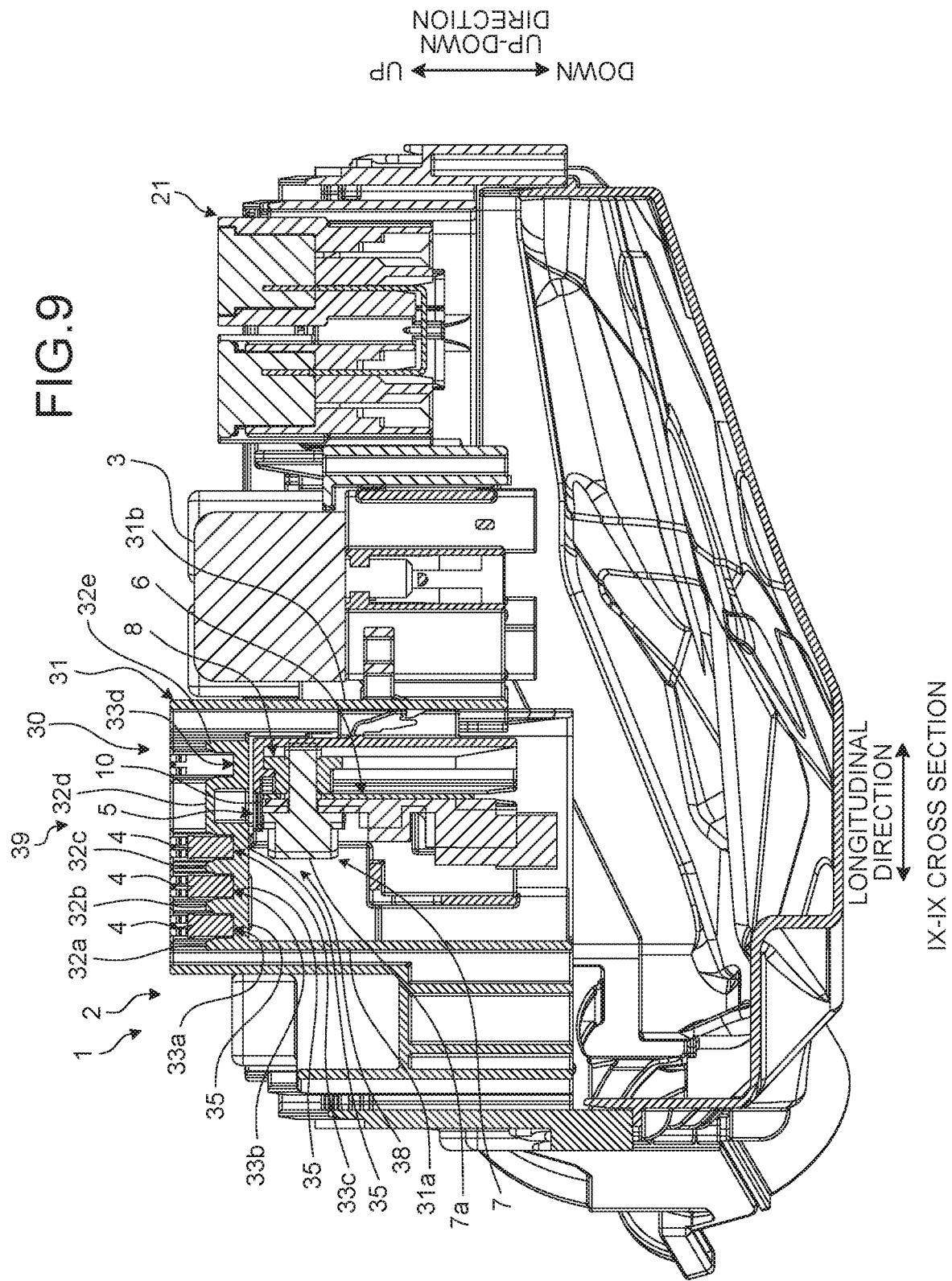
FIG. 9 is a longitudinal sectional view related to the power supply connection portion and the cover portion according to the embodiment.
Figure 10:
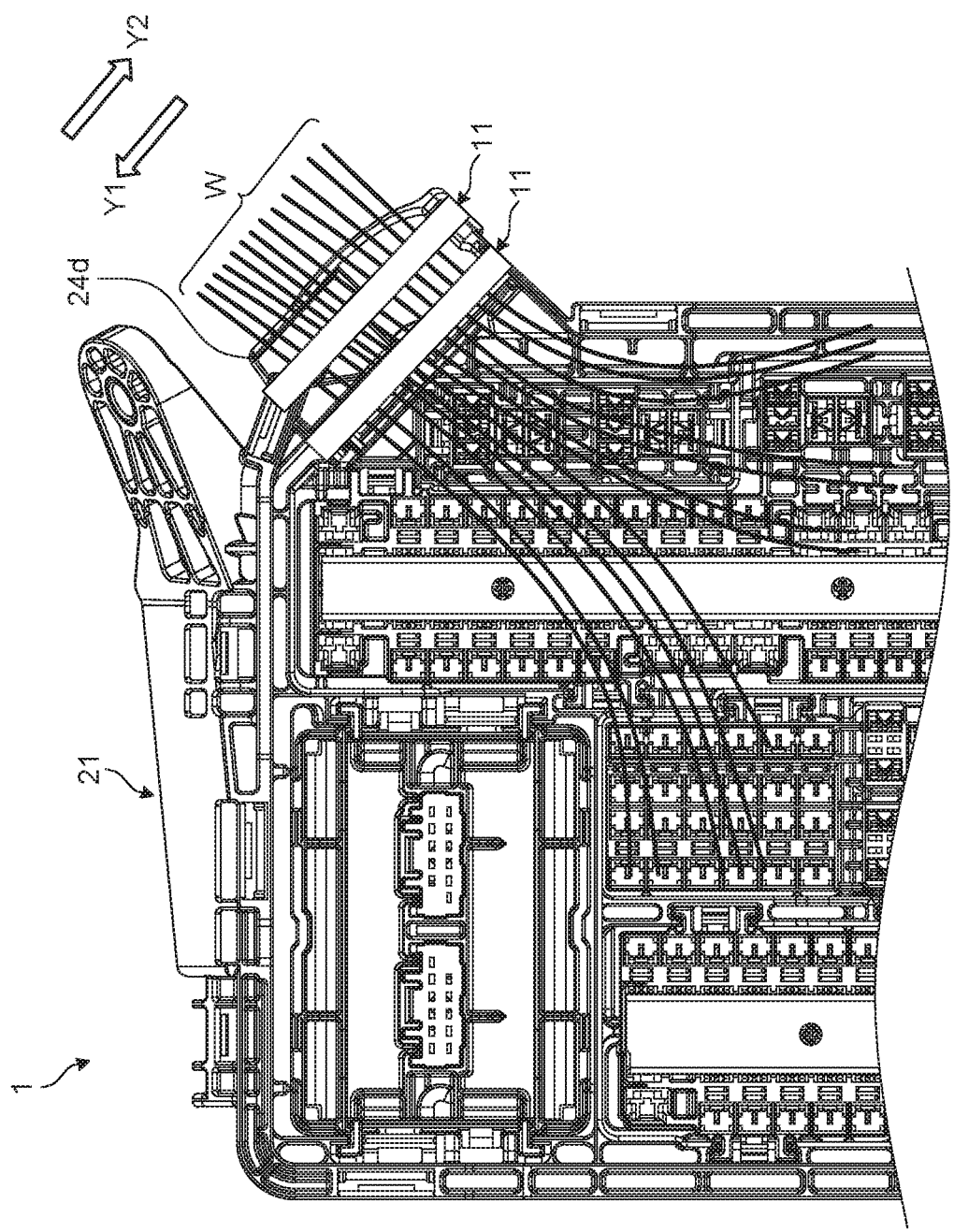
FIG. 10 is a rear view illustrating a fixed state of an electric wire according to the embodiment.

2 is a perspective view of a frame according to the embodiment, FIG. 3 is a perspective view of a lower cover according to the embodiment, FIG. 4 is a perspective view illustrating an inside of the electrical connection box according to the embodiment, FIG. 5 is a perspective view illustrating a power supply connection portion according to the embodiment, FIG. 6 is a perspective view illustrating the power supply connection portion and a holding member according to the embodiment, FIG. 7 is a plan view illustrating the inside of the electrical connection box according to the embodiment, FIG. 8 is a cross-sectional view related to the power supply connection portion and a cover portion according to the embodiment, FIG. 9 is a longitudinal sectional view related to the power supply connection portion and the cover portion according to the embodiment, and FIG. 10 is a rear view illustrating a fixed state of an electric wire according to the embodiment.

An electrical connection box 1 illustrated in FIG. 1 is included in a wire harness WH together with an electric wire W. The wire harness WH is installed in a vehicle such as an automobile to connect respective devices installed in the vehicle to each other. The wire harness WH includes a plurality of electric wires W used for power supply or signal communication. One end of each of the electric wires W is connected to an electronic component stored inside the electrical connection box 1. The other end of each of the electric wires W is connected to each device (external equipment) such as an electrical component or a battery through a connector and the like.

Figure 2:
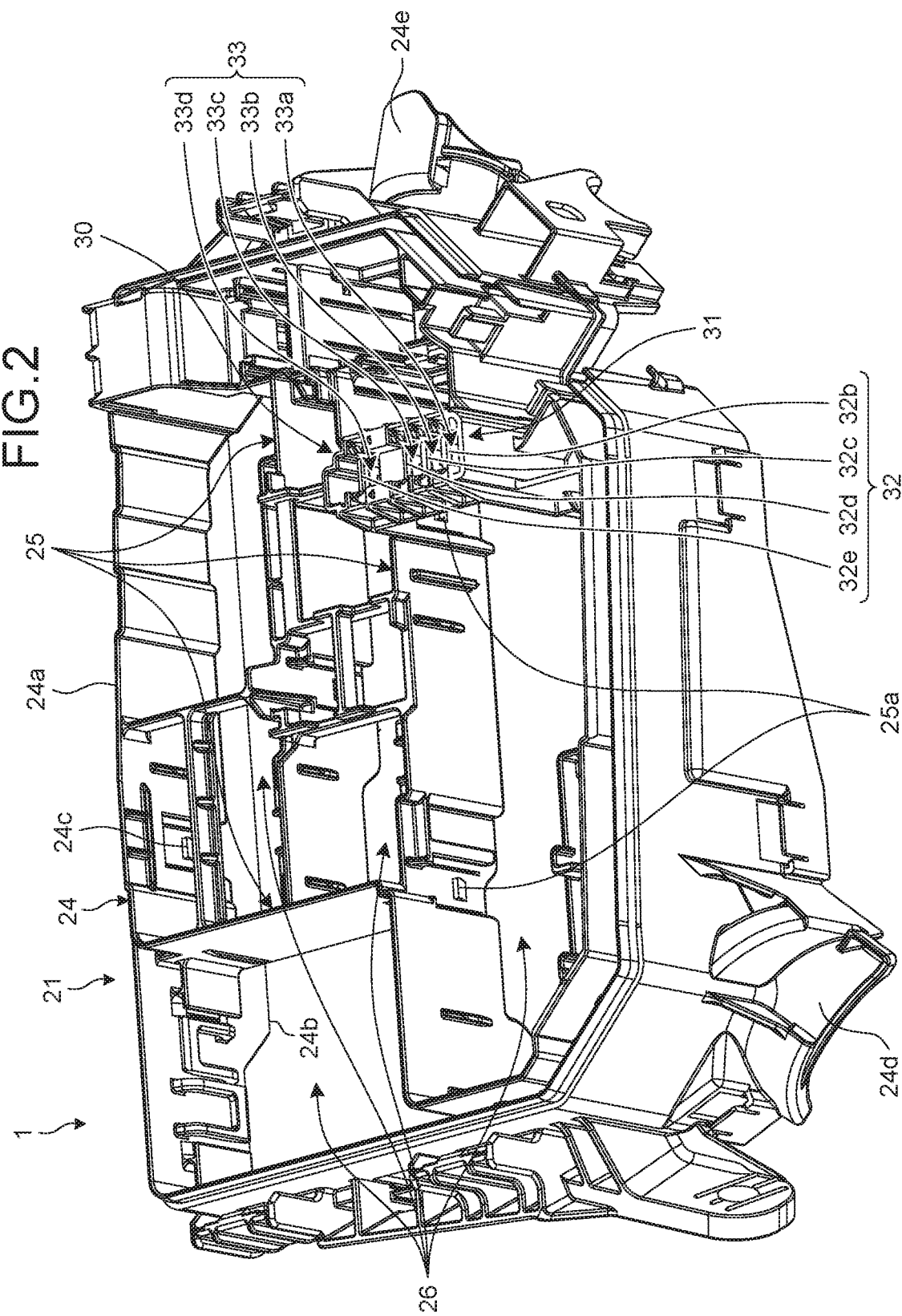
FIG. 2 is a perspective view of a frame according to the embodiment.

The electrical connection box 1 is referred to as a junction box, a fuse box, a relay box, or the like in some cases. However, in the present embodiment, the "electrical connection box" is used as a general term. The electrical connection box 1 includes a case 2 as a housing that accommodates the electronic component. The case 2 includes a frame 21, an upper cover 22, and a lower cover 23. The frame 21, the upper cover 22, and the lower cover 23 of the present embodiment are formed using synthetic resin. As illustrated in FIG. 2, an external wall 24 of the frame 21 has a shape of a square tube, and both ends of a cylindrical shape in an axial direction are opened. In other words, the external wall 24 of the frame 21 has a cross-sectional shape substantially corresponding to a polygon, and is a tubular portion, both ends of which in the axial direction are opened. The electrical connection box 1 of the present embodiment is installed in the vehicle such that one opening portion of the frame 21 (hereinafter referred to as an "upper opening portion") 24a faces upward, and the other opening portion (hereinafter referred to as a "lower opening portion") 24b faces downward. In description below, a direction such as an "up-down direction" indicates a direction in a state in which the electrical connection box 1 is installed in the vehicle. The upper opening portion 24a is blocked by the upper cover 22, and the lower opening portion 24b is blocked by the lower cover 23.

The frame 21 includes a partition wall 25 that partitions an inside of the external wall 24. The partition wall 25 is molded integrally with the external wall 24. The partition wall 25 partitions an internal space of the external wall 24 into a plurality of accommodation space portions 26. Each of the accommodation space portions 26 is opened toward at least one of an upper side and a lower side. The electronic component is inserted into the accommodation space portions 26 from opening portions of the accommodation space portions 26. A lock mechanism such as engaged hook portions 24c and 25a is provided on an internal wall surface of the external wall 24 and the partition wall 25. The electronic component (including a block corresponding to an assembly of electronic components) accommodated in the accommodation space portions 26 inside the frame 21 is locked by the lock mechanism.

The frame 21 includes a first upper tubular portion 24d and a second upper tubular portion 24e. The upper tubular portions 24d and 24e are half cylindrical components protruding from the external wall 24. The upper tubular portions 24d and 24e are formed to surround the opening portions provided in the external wall 24. As illustrated in FIG. 3, the lower cover 23 includes a first lower tubular portion 23b and a second lower tubular portion 23c corresponding to the upper tubular portions 24d and 24e. A main body portion 23a of the lower cover 23 is fit to the lower opening portion 24b of the frame 21 to block the lower opening portion 24b. The lower tubular portions 23b and 23c laterally protrude from the main body portion 23a. Each of the lower tubular portions 23b and 23c is a half cylindrical component. The first lower tubular portion 23b forms an insertion hole having a circular cross-section together with the first upper tubular portion 24d. The second lower tubular portion 23c forms an insertion hole having a circular cross-section together with the second upper tubular portion 24e. These insertion holes allow an internal space and an external space of the case 2 to communicate with each other. The electric wires W are inserted into these insertion holes.

As illustrated in FIG. 4, various electronic components are held inside the frame 21. The electrical connection box 1 of the present embodiment accommodates a plurality of relays 3 and fuses 4 therein. In addition, as illustrated in FIG. 5, a power supply connection portion 5 to which a terminal 10 is fixed is provided inside the frame 21. The power supply connection portion 5 includes a bus bar 6, a screw 7, and a nut 8. The bus bar 6 is a plate-shaped member formed using conductive metal. The bus bar 6 is fixed to the frame 21 through a resin holding member 9 (see FIG. 4). The relays 3 and the fuses 4 are electrically connected to the bus bar 6. The terminal 10 is fixed to one end of the bus bar 6 in a longitudinal direction. The terminal 10 is a terminal for connection with an external power supply. The terminal 10 is connected to the external power supply such as a battery through the electric wire W. A through-hole into which a male screw portion of the screw 7 can be inserted is formed in the bus bar 6 and the terminal 10. The male screw portion of the screw 7 is inserted into the through-hole of the terminal 10 and the through-hole of the bus bar 6 and screwed with the nut 8. In other words, the nut 8 is fastened to the screw 7 with the terminal 10 and the bus bar 6 interposed between the nut 8 and a head portion 7a of the screw 7. Power from an external power supply is supplied to an electronic component inside the case 2 through the electric wires W, the terminal 10, and the bus bar 6.

The holding member 9 illustrated in FIG. 6 and other FIGS. has a function of covering the bus bar 6 and a function of holding the bus bar 6. The holding member 9 covers the bus bar 6 from both surface sides and holds the bus bar 6. In addition, the holding member 9 is detachably fixed to the frame 21 by the lock mechanism. As illustrated in FIG. 6, the holding member 9 includes a pair of wall portions 9a and 9b that covers the power supply connection portion 5. Herein, in the present specification, a direction along a central axis line of the screw 7 and orthogonal to the up-down direction is referred to as a "longitudinal direction", and a direction orthogonal to each of the longitudinal direction and the up-down direction is referred to a "cross direction". The pair of wall portions 9a and 9b face each other in the cross direction with the power supply connection portion 5 and the terminal 10 interposed therebetween. The first wall portion 9a covers the power supply connection portion 5 and the terminal 10 from one side in the cross direction, and the second wall portion 9b covers the power supply connection portion 5 and the terminal 10 from the other side in the cross direction.

Herein, when a metal portion of the terminal 10 or the power supply connection portion 5 is exposed inside the case 2, there is a possibility that a tool or a finger of an operator will touch the metal portion during operation. It is desirable to inhibit the metal portion from being carelessly touched in advance. As described below with reference to FIG. 2, FIG. 7, and other FIGS. the electrical connection box 1 of the present embodiment includes a cover portion 30 that covers the power supply connection portion 5 from above. The cover portion 30 has an electrical insulating property. The cover portion 30 covers the power supply connection portion 5 and the terminal 10 integrally, and protects the terminal 10 and the power supply connection portion 5 from being touched by the finger of the operator or the tool. Further, the cover portion 30 includes a hole portion 33 that releases heat generated in the power supply connection portion 5. The hole portion 33 releases heat inside the cover portion 30 upward to suppress a temperature rise of the terminal 10 and the power supply connection portion 5. Therefore, the cover portion 30 of the present embodiment may inhibit the power supply connection portion 5 from being unintentionally touched by the tool or the like while suppressing a temperature rise of the power supply connection portion 5.

As illustrated in FIG. 2, the cover portion 30 of the present embodiment is a portion of the frame 21, and is molded integrally with the external wall 24 and the partition wall 25. As illustrated in FIG. 2 and FIG. 7, the cover portion 30 includes an external wall portion 31 and a plurality of partition portions 32 (a first partition portion 32a, a second partition portion 32b, a third partition portion 32c, a fourth partition portion 32d, and a fifth partition portion 32e).

The external wall portion 31 is a hollow tubular portion, a cross-sectional shape of which is a rectangular shape, and extends in the up-down direction. As illustrated in FIG. 7, the external wall portion 31 includes a front wall portion 31a, a rear wall portion 31b, a first side wall portion 31c, and a second side wall portion 31d. The front wall portion 31a and the rear wall portion 31b face each other in the longitudinal direction. As illustrated in FIG. 9, the front wall portion 31a is a wall portion facing the bus bar 6 with the terminal 10 interposed therebetween, that is, a wall portion facing the head portion 7a of the screw 7 in the longitudinal direction. The rear wall portion 31b is a wall portion facing the front wall portion 31a with the terminal 10 and the power supply connection portion 5 interposed therebetween. The first side wall portion 31c and the second side wall portion 31d face each other in the cross direction. The first side wall portion 31c connects one-side ends of the front wall portion 31a and the rear wall portion 31b in the longitudinal direction, and the second side wall portion 31d connects the other-side ends of the front wall portion 31a and the rear wall portion 31b in the longitudinal direction.

As illustrated in FIG. 7 and FIG. 9, the internal space surrounded by the external wall portion 31 is partitioned into a plurality of hole portions 33 (a first hole portion 33a, a second hole portion 33b, a third hole portion 33c, and a fourth hole portion 33d) by the partition portions 32. In addition, a front communication hole portion 36a is provided between the first partition portion 32a and the front wall portion 31a, and a rear communication hole portion 36b is provided between the fifth partition portion 32e and the rear wall portion 31b. The partition portions 32 are partition walls perpendicular to the longitudinal direction. The first hole portion 33a to the third hole portion 33c detachably hold an auxiliary fuse 4. The fourth hole portion 33d detachably holds a temporarily detached fuse 4 during inspection or operation or while carrying the vehicle. The hole portions 33a, 33b, 33c, 33d, 36a, and 36b allow communication between a space portion 38 positioned on the power supply connection portion 5 side with respect to the cover portion 30 and a space portion 39 above the cover portion 30 inside the case 2. The hole portions 33a, 33b, 33c, 33d, 36a, and 36b are through-holes penetrating the cover portion 30 in the up-down direction. A pair of engaged portions 34 (a first engaged portion 34a and a second engaged portion 34b) and a support 35 are provided in each of the hole portions 33a, 33b, 33c, and 33d.

As illustrated in FIG. 8, the engaged portion 34 is integrally formed with the external wall portion 31. The engaged portion 34 includes a flexible main body 341 and a hook portion 342 provided at a distal end of the main body 341. A base end of the main body 341 is connected to internal wall surfaces of the side wall portions 31c and 31d. The main body 341 extends upward from the base end. The hook portion 342 protrudes in the cross direction from the distal end of the main body 341. Specifically, the hook portion 342 of the first engaged portion 34a protrudes toward the second engaged portion 34b side, and the hook portion 342 of the second engaged portion 34b protrudes toward the first engaged portion 34a. A gap is provided between the main body 341 and the side wall portions 31c and 31d. Therefore, the main body 341 is bent and deformed when the fuse 4 is inserted into the hole portion 33, and allows the fuse 4 to pass between two hook portions 342. As illustrated in FIG. 8, the hook portion 342 is engaged with a shoulder portion of the fuse 4 inserted into the hole portion 33 to hold the fuse 4 together with the support 35.

The support 35 supports the fuse 4 from below. The support 35 is provided in a middle portion between the first engaged portion 34a and the second engaged portion 34b. The support 35 extends in the longitudinal direction, and connects adjacent partition portions 32 to each other. For example, as illustrated in FIG. 9, the support 35 of the third hole portion 33c is connected to the third partition portion 32c and the fourth partition portion 32d.

As illustrated in FIG. 8 and FIG. 9, the cover portion 30 covers the terminal 10 and the power supply connection portion 5 from above. As illustrated in FIG. 8, the second side wall portion 31d of the cover portion 30 covers the terminal 10 and the power supply connection portion 5 from one side in the cross direction. As described in the foregoing, the wall portions 9a and 9b of the holding member 9 covers the terminal 10 and the power supply connection portion 5 from both sides in the cross direction. The second side wall portion 31d covers the wall portion 9b from outside. As illustrated in FIG. 9, the front wall portion 31a of the cover portion 30 covers the terminal 10 and the power supply connection portion 5 from a front side (a side of the head portion 7a of the screw 7). Meanwhile, the rear wall portion 31b of the cover portion 30 covers the terminal 10 and the power supply connection portion 5 from a rear side (a side of the nut 8).

As described above, the electrical connection box 1 and the wire harness WH of the present embodiment include the cover portion 30 that covers the power supply connection portion 5 from above. Therefore, the electrical connection box 1 and the wire harness WH of the present embodiment may inhibit the finger of the operator or the tool from unintentionally touching the terminal 10 and the power supply connection portion 5. The cover portion 30 has the hole portion 33 that allows communication between the space portion 38 positioned on the power supply connection portion 5 side with respect to the cover portion 30 and the space portion 39 above the cover portion 30 inside the case 2. Therefore, the electrical connection box 1 and the wire harness WH of the present embodiment may accelerate radiation of heat from the power supply connection portion 5 and the terminal 10 to suppress a temperature rise. Further, the hole portion 33 detachably holds the component (the fuse 4 in the present embodiment). Therefore, the electrical connection box 1 and the wire harness WH of the present embodiment achieve miniaturization by effectively utilizing a space above the power supply connection portion 5 to hold the component.

The cover portion 30 which has a heat radiation structure using a die cutting structure that fixes the auxiliary fuse 4 is provided in the electrical connection box 1 of the present embodiment. As the cover portion 30 is integrally formed with the frame 21, a protection structure of the power supply connection portion 5 is achieved without causing increase of the number of components.

In addition, the cover portion 30 of the present embodiment includes a pair of wall portions (the front wall portion 31a and the rear wall portion 31b) which extend in the up-down direction and face each other with the power supply connection portion 5 interposed therebetween, and covers the power supply connection portion 5 from both sides using the pair of wall portions 31a and 31b. In other words, the cover portion 30 not only merely covers an upper part of the power supply connection portion 5, but also covers the both sides at sides. Therefore, the cover portion 30 may appropriately inhibit the tool or the like from unintentionally touching the power supply connection portion 5.

In addition, the cover portion 30 of the present embodiment protects the held fuse 4 from impact. As illustrated in FIG. 8, upper ends of the first side wall portion 31c and the second side wall portion 31d of the cover portion 30 protrudes up to an upper side than the fuse 4 accommodated in the hole portion 33. Further, the cover portion 30 protects the fuse 4 using a dual structure provided between the side wall portions 31c and 31d and the engaged portions 34a and 34b. In addition, as illustrated in FIG. 9, the front wall portion 31a and the rear wall portion 31b protrude up to an upper side than the fuse 4 accommodated in the hole portion 33. Therefore, the cover portion 30 may protect the fuse 4 from an object that falls from above, or protect the fuse 4 when the cover portion 30 touches another object. In addition, as illustrated in FIG. 8, ribs 37 are provided on outer surfaces of the first side wall portion 31c and the second side wall portion 31d. The ribs 37 protect the fuse 4 by reinforcing the side wall portions 31c and 31d.

In addition, in the electrical connection box 1 of the present embodiment, the electric wires W are fixed to the frame 21 at two places as described with reference to FIG. 10. In this way, a shift in electric wires W is suppressed, and an improvement in fixing force is achieved. As illustrated in FIG. 10, the plurality of electric wires W connected to the electronic component inside the frame 21 is bound and allowed pass through the first upper tubular portion 24d. The electric wires W are fixed to the first upper tubular portion 24d by a binding band 11. In the electrical connection box 1 of the present embodiment, the electric wires W are fixed by the binding band 11 at a plurality of places along the axial direction of the first upper tubular portion 24d. In this way, a shift in the electric wires W is suppressed when an external force in a direction perpendicular to axes indicated by arrows Y1 and Y2 in FIG. 10 acts on the electric wires W.

FIG. 11 is a diagram illustrating a fixed state of electric wires according to a comparative example. In a case in which one fixed place by a binding band 11 is present as in the comparative example illustrated in FIG. 11, when an external force perpendicular to an axis acts on the electric wires W, the electric wires W are easily shifted by being inclined using the fixed place as a fulcrum. On the other hand, in the electrical connection box 1 of the present embodiment, the electric wires W are fixed by the binding band 11 at two places separated from each other in the axial direction. Therefore, a shift in the electric wires W using a fixed place as a fulcrum is suppressed. In addition, fixing power with respect to the electric wires W is improved by performing fixing by the binding band 11 at a plurality of places when compared to the comparative example in which one fixed place is present. Therefore, a shift in the electric wires W is suppressed even in the case of an external force in a different direction from a direction perpendicular to the axis, for example, an external force along the axial direction.

Modified Example of Embodiment

A modified example of the embodiment will be described. In the above embodiment, the cover portion 30 is formed integrally with the frame 21. However, the cover portion 30 and the frame 21 may be different bodies. In this case, the cover portion 30 may be attached to and detached from the frame 21, and may be attached to and detached from the holding member 9. The cover portion 30 preferably has higher thermal conductivity than thermal conductivity of the frame 21. The cover portion 30 may have a heat radiating fin. The ribs 37 may serve as the heat radiating fin.

An aspect of connection between the external power supply and the power supply connection portion 5 is not restricted to an example in the above embodiment. For example, a fixing means for fixing the terminal 10 is not restricted to the screw 7 and the nut 8. For example, the electric wires W connected to the external power supply may be connected to the power supply connection portion 5 without the terminal 10 interposed therebetween.

Content disclosed in the above embodiment and the modified example may be appropriately combined and implemented.

An electrical connection box and a wire harness according to the present embodiment include a cover portion that covers a power supply connection portion from above. The cover portion has a hole portion that communicates a space portion on a side of the power supply connection portion with respect to the cover portion with a space portion above the cover portion inside the case, and detachably holds a component. The electrical connection box and the wire harness according to the present embodiment may allow compatibility between inhibiting the power supply connection portion from being unintentionally touched and suppressing a temperature rise of the power supply connection portion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
a case including a frame that holds an electronic component and a cover that blocks an opening portion of the frame;
a power supply connection portion provided inside the case, an external power supply including a terminal contacting the power supply connection portion; and
a cover portion being connected to the frame and including an external wall portion that surrounds the power supply connection portion and the terminal, and the cover portion covering the power supply connection portion and the terminal from above, wherein
a first space portion is located on a side of the cover portion facing the power supply connection portion,
a second space portion is located between the cover portion and the cover,
the cover portion includes through holes between the first space portion and the second space portion,
the cover portion is configured to detachably house components in the through holes,
the through holes include a first through hole configured to house an auxiliary component and an extra through hole configured to house a temporarily detached component,
the cover portion includes a partition portion located between the first through hole and the extra through hole, the partition portion has a first wall that extends along the first through hole, a second wall that extends along the extra through hole, and a horizontal connection wall that extends from and is connected to each of the first wall and the second wall such that the first through hole is spaced away from the extra through hole via the horizontal connection wall, and such that a first gap is located under the horizontal connection wall and bounded by the first wall, the second wall and the horizontal connection wall, and the first gap extends substantially halfway from a bottom of the cover portion.

2. The electrical connection box according to claim 1, wherein
the auxiliary component detachably house by the first through hole is a fuse.

3. The electrical connection box according to claim 1, wherein
the cover portion includes a pair of wall portions extending in an up-down direction and facing each other with the power supply connection portion interposed therebetween, and covers the power supply connection portion from both sides by the pair of wall portions.

4. The electrical connection box according to claim 2, wherein
the cover portion includes a pair of wall portions extending in an up-down direction and facing each other with the power supply connection portion interposed therebetween, and covers the power supply connection portion from both sides by the pair of wall portions.

5. The electrical connection box according to claim 1, wherein
the external wall surrounds an internal space, and
the cover portion includes a plurality of partition portions that partition the internal space.

6. The electrical connection box according to claim 5, wherein
the plurality of partition portions partition the internal space into the through holes.

7. The electrical connection box according to claim 1, wherein
the cover portion includes a pair of engaged portions and a support portion in each of the through holes.

8. A wire harness comprising:
a case including a frame that holds an electronic component and a cover that blocks an opening portion of the frame;
a power supply connection portion provided inside the case, an external power supply including a terminal contacting the power supply connection portion;
a cover portion being connected to the frame and including an external wall portion that surrounds the power supply connection portion and the terminal, and the cover portion covering the power supply connection portion and the terminal from above; and
an electric wire connected to the electronic component, wherein
a first space portion is located on a side of the cover portion facing the power supply connection portion,
a second space portion is located between the cover portion and the cover,
the cover portion includes through holes between the first space portion and the second space portion,
the cover portion is configured to detachably hold components in the through holes,
the through holes include a first through hole configured to house an auxiliary component and an extra through hole is configured to house a temporarily detached component,
the cover portion includes a partition portion located between the first through hole and the extra through hole, the partition portion has a first wall that extends along the first through hole, a second wall that extends along the extra through hole, and a horizontal connection wall that extends from and is connected to each of the first wall and the second wall such that the first through hole is spaced away from the extra through hole via the horizontal connection wall, and such that a first gap is located under the horizontal connection wall and bounded by the first wall, the second wall and the horizontal connection wall, and the first gap extends substantially halfway from a bottom of the cover portion.

9. An electrical connection box comprising:
a case including a frame that holds an electronic component and a cover that blocks an opening portion of the frame, the frame includes an external wall and a plurality of partition walls, the external wall surrounds an internal space, and the plurality of partition walls partition the internal space into a plurality of accommodation space portions;
a power supply connection portion provided inside one of the plurality of accommodation space portions of the case, an external power supply including a terminal contacting the power supply connection portion; and
a cover portion being connected to the frame and including an external wall portion that surrounds the power supply connection portion and the terminal, and the cover portion covering the power supply connection portion and the terminal from above, wherein
a first space portion is located on a side of the cover portion facing the power supply connection portion,
a second space portion is located between the cover portion and the cover, the cover portion includes through holes that are positioned above the power supply connection portion and positioned between the first space portion and the second space portion the cover portion is configured to detachably hold components in the through holes, and the through holes include a first through hole configured to house an auxiliary component and an extra through hole configured to house a temporarily detached component, the cover portion includes a partition portion located between the first through hole and the extra through hole, the partition portion has a first wall that extends along the first through hole, a second wall that extends along the extra through hole, and a horizontal connection wall that extends from and is connected to each of the first wall and the second wall such that the first through hole is spaced away from the extra through hole via the horizontal connection wall, and such that a first gap is located under the horizontal connection wall and bounded by the first wall, the second wall and the horizontal connection wall, and the first gap extends substantially halfway from a bottom of the cover portion.

\* \* \* \* \*